US010523833B2

(12) United States Patent
Tokonami

(10) Patent No.: US 10,523,833 B2
(45) Date of Patent: Dec. 31, 2019

(54) IMAGE READING DEVICE INCLUDING AN ILLUMINATION UNIT WITH FIRST AND SECOND LIGHT GUIDE BODIES AND AN IMAGE FORMING APPARATUS INCLUDING THE SAME

(71) Applicant: KYOCERA Document Solutions Inc., Osaka (JP)

(72) Inventor: Minoru Tokonami, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/111,428

(22) Filed: Aug. 24, 2018

(65) Prior Publication Data

US 2019/0068816 A1   Feb. 28, 2019

(30) Foreign Application Priority Data

Aug. 25, 2017   (JP) .................................. 2017-162254

(51) Int. Cl.
*G06F 3/16* (2006.01)
*H04N 1/00* (2006.01)

(52) U.S. Cl.
CPC ..... *H04N 1/00816* (2013.01); *H04N 1/00551* (2013.01); *H04N 1/00997* (2013.01)

(58) Field of Classification Search
CPC ........... H04N 1/00816; H04N 1/00551; H04N 1/0097; H04N 1/04; H04N 1/02815; H04N 1/00997

USPC .................. 358/1.1–1.18, 474, 475, 509
See application file for complete search history.

(56) References Cited

U.S. PATENT DOCUMENTS

| | | | |
|---|---|---|---|
| 2012/0170083 A1* | 7/2012 | Joh .................... | H04N 1/00013 358/475 |
| 2012/0307322 A1* | 12/2012 | Ozawa ............... | G03G 15/0409 358/475 |
| 2014/0192386 A1* | 7/2014 | Ishida ................ | H04N 1/00689 358/449 |
| 2015/0055196 A1 | 2/2015 | Kurotsu | |
| 2016/0057294 A1* | 2/2016 | Kobayashi ........... | H04N 1/0074 358/449 |
| 2018/0332183 A1* | 11/2018 | Seki ................... | H04N 1/00997 |

* cited by examiner

*Primary Examiner* — Gabriel I Garcia
(74) *Attorney, Agent, or Firm* — Wenderoth, Lind & Ponack, L.L.P.

(57) ABSTRACT

An image reading device includes a housing that is provided with a contact glass, a document cover, an illumination unit that is received in the housing, and a document size detection unit that performs a document size detection operation for detecting a size of a document by using light irradiated toward the document on the contact glass from the illumination unit when the document cover is switched to a closed state. The illumination unit includes a light guide body extending in a front and rear direction of the housing, a first light source that is disposed at a front side of the light guide body and emits incident light to the light guide body toward a rear side, and a second light source that is disposed at a rear side of the light guide body. In the document size detection operation, only the first light source is lighted.

5 Claims, 9 Drawing Sheets

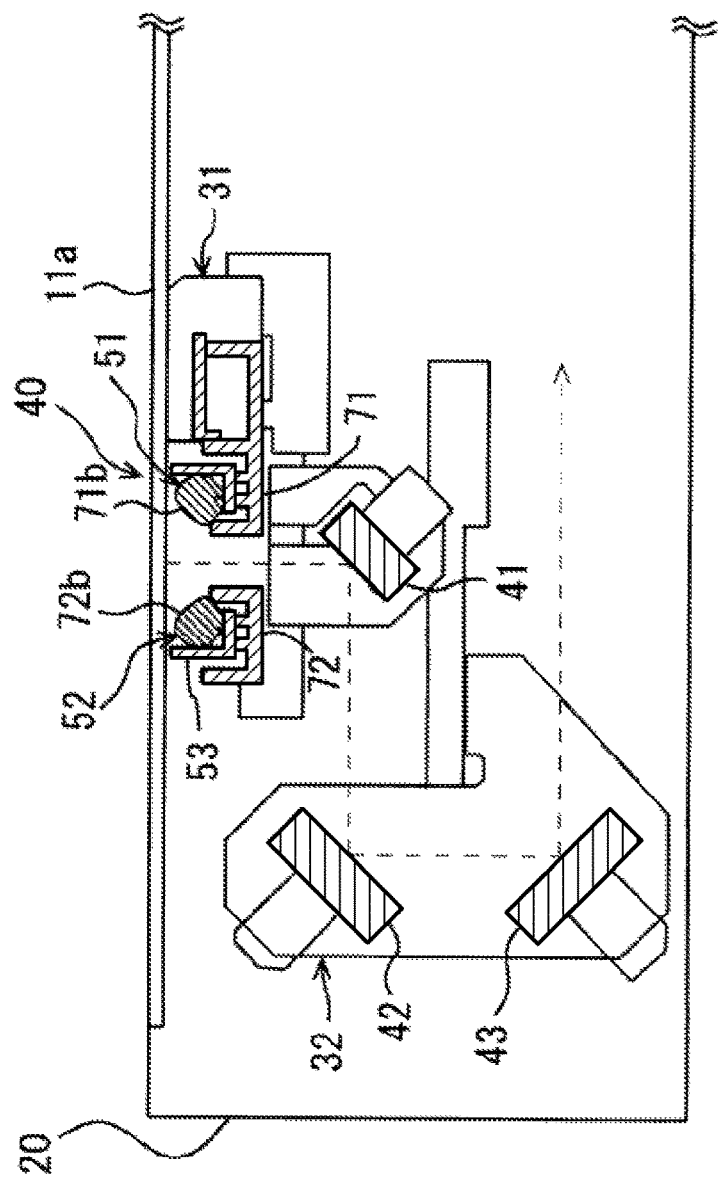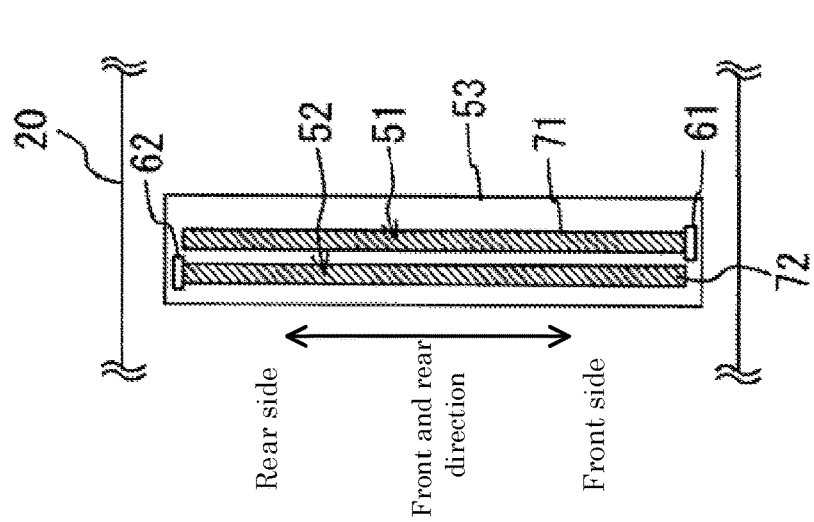

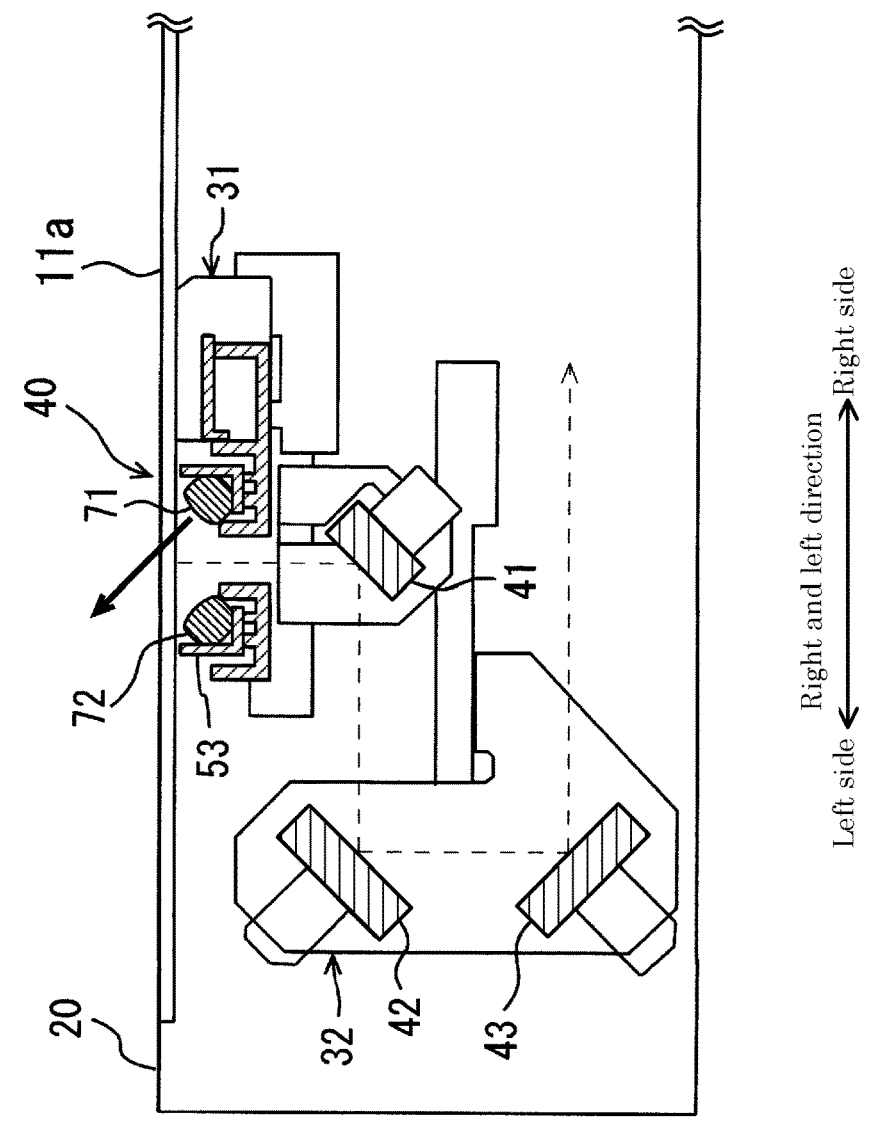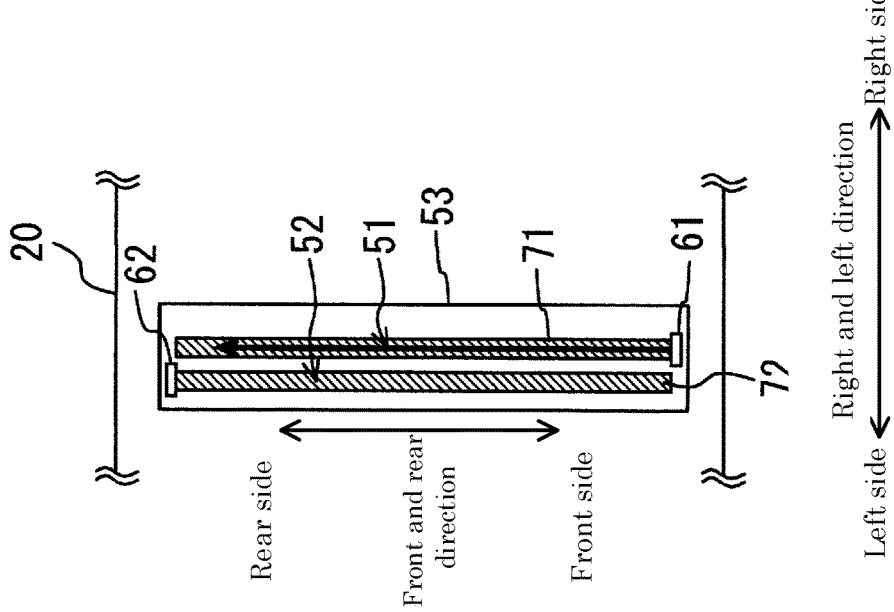

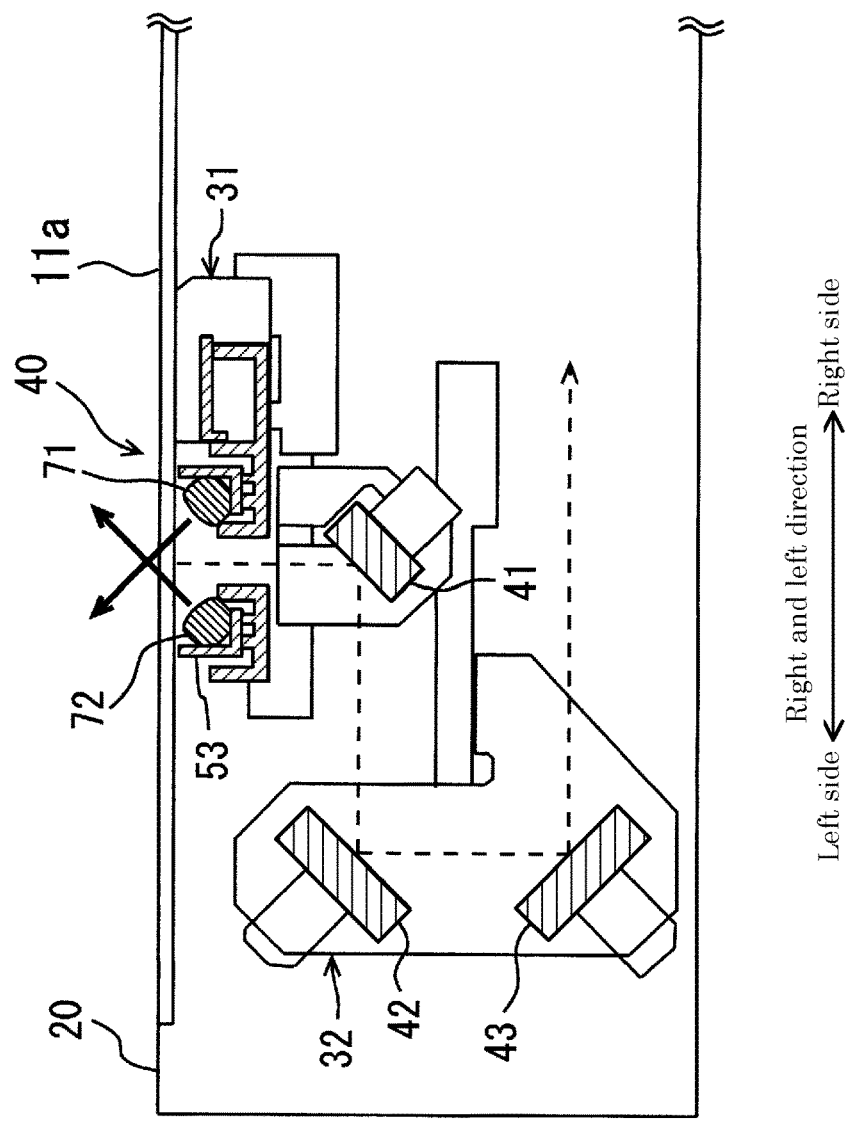
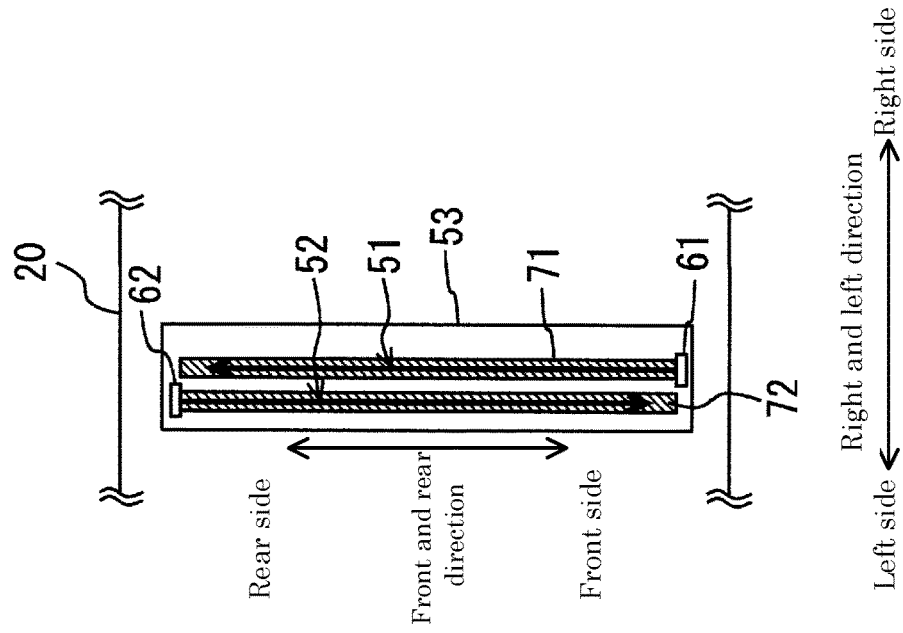

IMAGE READING DEVICE INCLUDING AN ILLUMINATION UNIT WITH FIRST AND SECOND LIGHT GUIDE BODIES AND AN IMAGE FORMING APPARATUS INCLUDING THE SAME

CROSS-REFERENCE TO RELATED APPLICATION

This application is based upon and claims the benefit of priority from Japanese Patent Application No. 2017-162254 filed on Aug. 25, 2017, the entire contents of which are incorporated herein by reference.

BACKGROUND

The technology of the present disclosure relates to an image reading device and an image forming apparatus including the same.

In the related art, there has been known an image reading device that optically reads an image of a document placed on a contact glass and generates image data. In this type of image reading device, there is a case where the size of the document is detected. In this case, an illumination unit is used to irradiate liner illumination light long in a main scanning direction (a front and rear direction). In the illumination operation for detection of the document size, two light sources are respectively allowed to emit light at both end sides in the front and rear direction, so that light sufficient for detecting the size of a document sheet is irradiated.

SUMMARY

An image reading device according to one aspect of the present disclosure includes a housing, a document cover, an illumination unit, and a document size detection unit. The housing is provided on an upper surface thereof with a contact glass. The document cover is mounted at the housing so as to be openable and closable and covers the contact glass in a closed state. The illumination unit is received in the housing and irradiates a document on the contact glass from a rear surface of the contact glass. The document size detection unit performs a document size detection operation for detecting a size of the document by using light irradiated toward the document on the contact glass from the illumination unit when the document cover is switched to the closed state from an open state.

The illumination unit includes one or a plurality of light guide bodies extending in a front and rear direction of the housing, a first light source, and a second light source. The first light source is disposed at a front side of the light guide body and emits incident light to the light guide body toward a rear side. The second light source is disposed at a rear side of the light guide body and emits incident light to the light guide body toward a front side. In the light guide body, an emitting surface of the light incident from the front side or the rear side is opposite to the contact glass.

In the document size detection operation, only the first light source of the first light source and the second light source is lighted.

An image forming apparatus according to another aspect of the present disclosure includes the aforementioned image reading device and an image forming apparatus body. The image forming apparatus body forms the image of the document read by the image reading device on a sheet.

BRIEF DESCRIPTION OF THE DRAWINGS

FIG. 6A is a view for explaining an arrangement of light sources and light guide bodies with respect to an illumination unit of an embodiment when the housing is viewed from above.

FIG. 6B is a view for explaining an arrangement of light sources and light guide bodies with respect to an illumination unit of an embodiment when an interior of the housing is viewed from the front side.

FIG. 8A is a view for explaining a light irradiation state of an illumination unit in a document size detection operation in an image reading device of an embodiment when the housing is viewed from above.

FIG. 8B is a view for explaining a light irradiation state of an illumination unit in a document size detection operation in an image reading device of an embodiment when an interior of the housing is viewed from the front side.

FIG. 9A is a view for explaining a light irradiation state of an illumination unit in a document reading operation of a manually placing mode in an image reading device of an embodiment when the housing is viewed from above.

FIG. 9B is a view for explaining a light irradiation state of an illumination unit in a document reading operation of a manually placing mode in an image reading device of an embodiment when an interior of the housing is viewed from the front side.

DETAILED DESCRIPTION

Hereinafter, an example of an embodiment will be described in detail on the basis of the drawings. It is noted that the technology of the present disclosure is not limited to the following embodiments.

Figure 1:
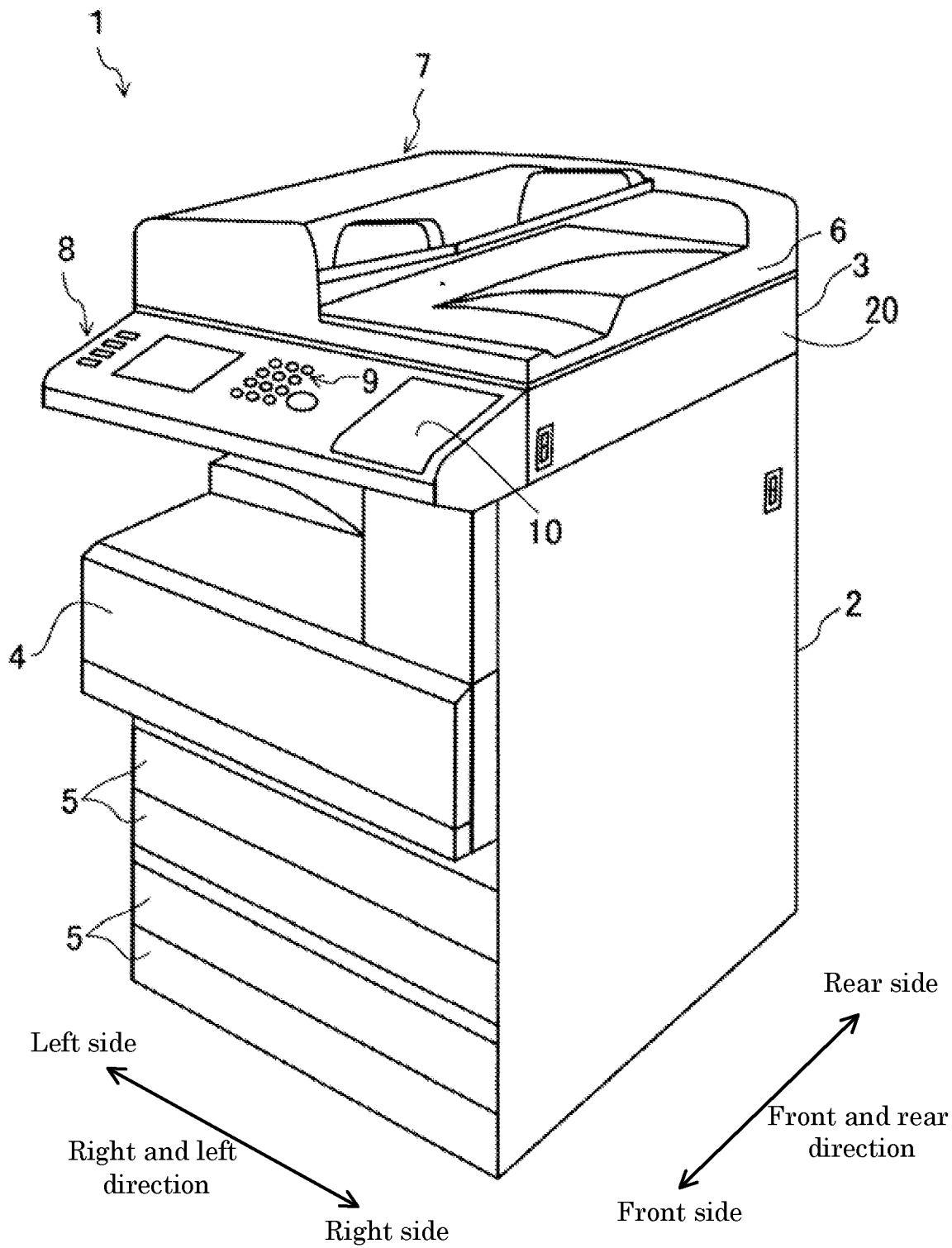
FIG. 1 is a perspective view of an image forming apparatus including an image reading device of an embodiment.

FIG. 1 illustrates a schematic configuration diagram of an image forming apparatus 1 in an embodiment. The image forming apparatus 1 is a composite type image forming apparatus (a multifunctional peripheral) having a scanner function, a facsimile function, and a copy function in addition to a print function. In the following description, it is assumed that a front side and a rear side indicate a front side and a rear side of the image forming apparatus 1 and a left side and a right side indicate a left side and a right side when the image forming apparatus 1 is viewed from the front side (a side of an operation panel 8 to be described later).

As illustrated in FIG. 1, the image forming apparatus 1 includes an image forming apparatus body 2 and an image reading device 3 disposed above the image forming apparatus body 2. The image forming apparatus body 2 has a print unit 4 disposed at an intermediate part in an up and down direction of the image forming apparatus body 2, and a plurality of sheet feeding cassettes 5 disposed below the print unit 4. The sheet feeding cassettes 5 have different sizes of sheets therein. The print unit 4 performs printing on the sheet supplied from the sheet feeding cassettes 5 on the basis of predetermined image data. As a printing scheme of the print unit 4, an electrophotographic scheme is employed. That is, the print unit 4 forms an electrostatic latent image by irradiating a surface of a photosensitive drum with laser light corresponding to image data, develops the electrostatic latent image by using toner, and transfers the developed image to the sheet.

—For Image Reading Device—

Figure 2:
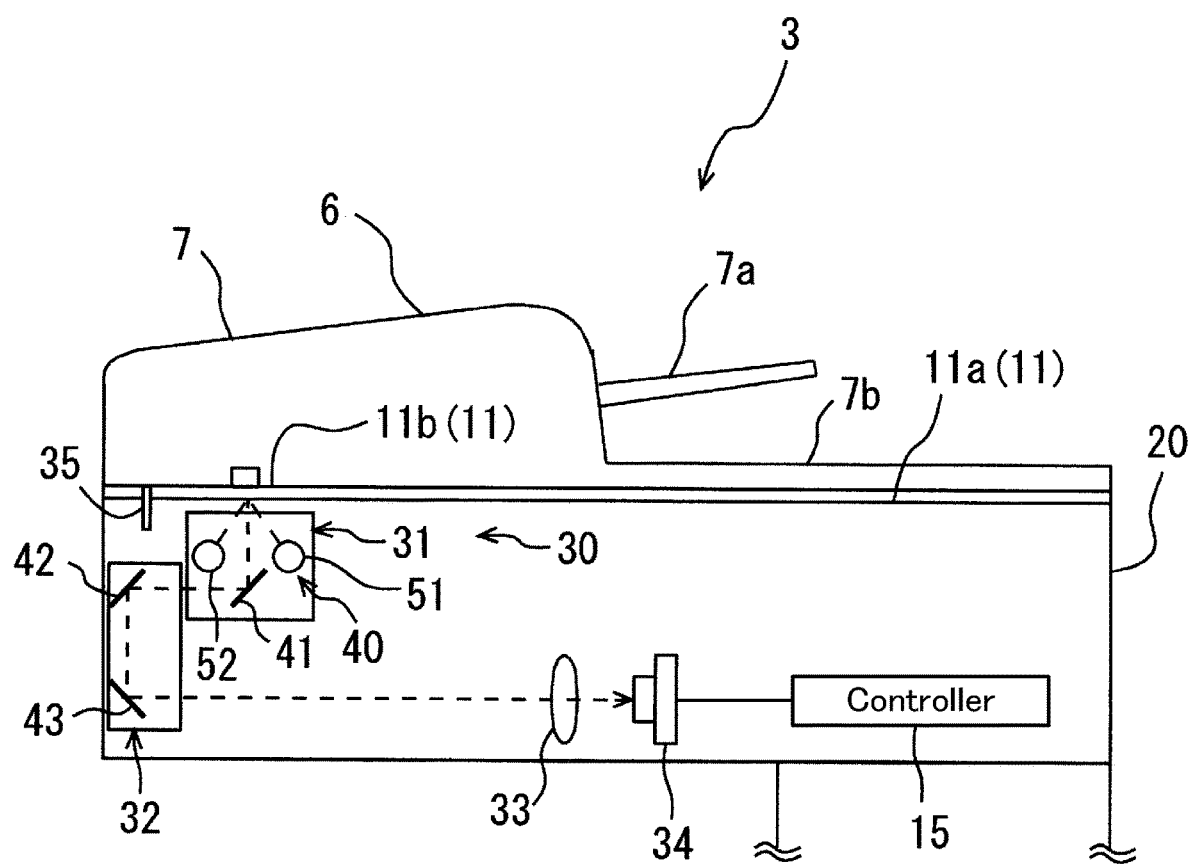
FIG. 2 is a schematic configuration diagram of an image reading device of an embodiment.
Figure 3:
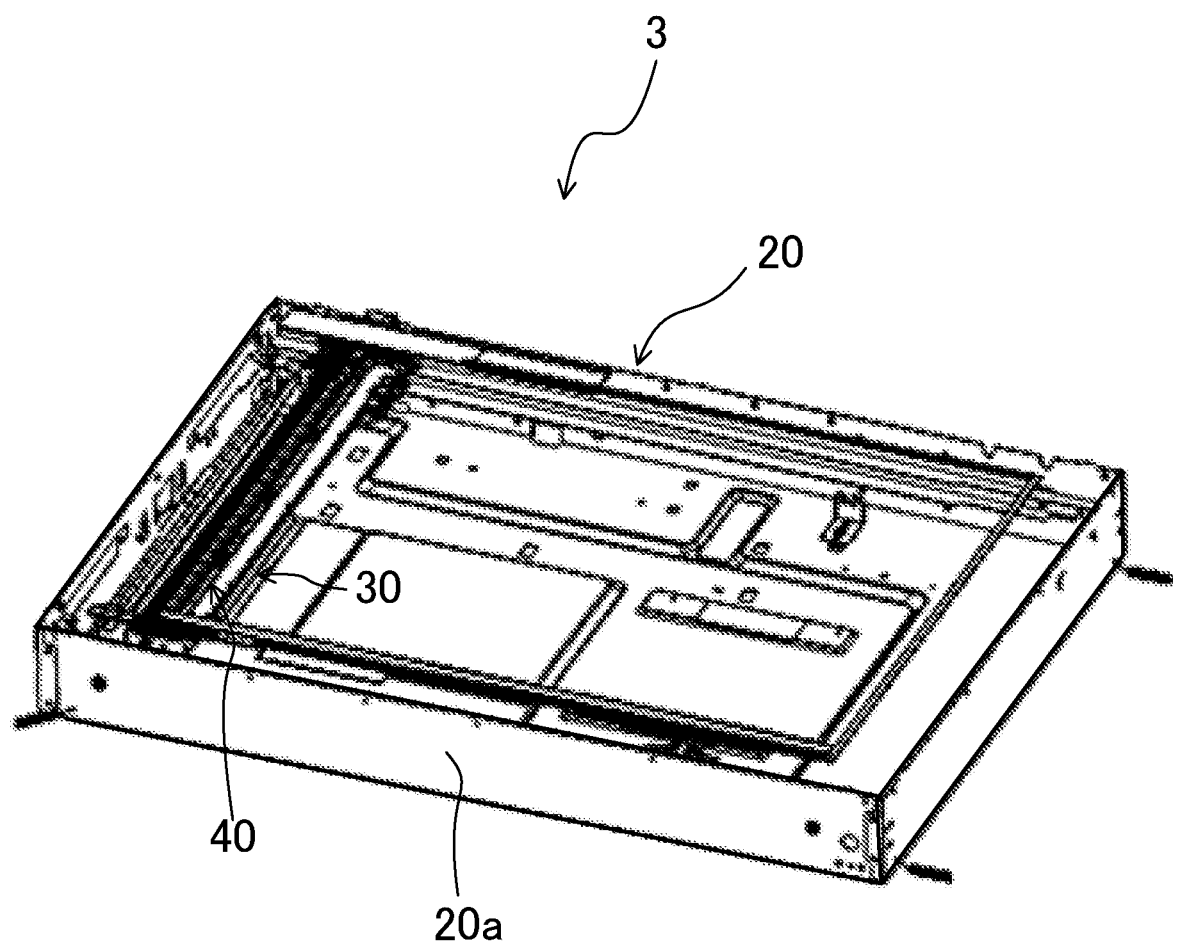
FIG. 3 is a perspective view of a housing and the like of an image reading device of an embodiment.

FIG. 2 illustrates a schematic configuration diagram of the image reading device 3 in the embodiment. FIG. 3 illustrates a perspective view of a housing 20 of the image reading device 3 in the embodiment. The image reading device 3 is a device that optically reads an image of a document (a document sheet) on a contact glass 11 and generates image data corresponding to the image of the document. In the present embodiment, for the image reading device 3, a front and rear direction corresponds to a "main scanning direction" and a right and left direction corresponds to a "sub-scanning direction".

As illustrated in FIG. 2, the image reading device 3 includes the housing 20 provided on the upper surface thereof with the contact glass 11, a document cover 6 that is mounted at the housing 20 so as to be openable and closable and covers the upper surface of the contact glass 11 in a closed state, and a reading unit 30 received in the housing 20. The document cover 6 is integrally formed with an automatic document feeder (ADF) 7. In addition, as illustrated in FIG. 1, from a front surface part of the image reading device 3, an operation panel is formed to protrude. The operation panel 8 is provided with an operation unit 9 including a numeric keypad and a start key, and a display unit 10 including a liquid crystal display.

The image reading device 3 performs a document reading operation that reads an image of a document. The document reading operation includes a manually placing mode in which a document placed on the contact glass 11 by a user is read, and an automatic sheet feeding mode in which a document automatically supplied by the automatic document feeder 7 is read. Furthermore, before performing the document reading operation of the manually placing mode, the image reading device 3 performs a document size detection operation for detecting the size of a document placed on the contact glass 11 by a user.

The housing 20 includes an approximately rectangular parallelepiped-like box body 20a (see FIG. 3) opened upward, and the contact glass 11 mounted at an upper opening of the box body 20a. The contact glass 11 includes a first contact glass 11a on which a document to be read in the document reading operation of the manual placing mode is placed, and a second contact glass 11b having an upper side through which a document to be read in the document reading operation of the automatic sheet feeding mode passes. The first contact glass 11a is formed in a rectangular plate shape and occupies a wide range on the upper surface of the housing 20. The second contact glass 11b is formed in a rectangular plate shape elongated in the front and rear direction and is disposed at a left side of the first contact glass 11a on the upper surface of the housing 20.

The document cover 6 is placed at the upper side of the housing 20. The document cover 6 is mounted at the housing 20 so as to be openable and closable by using a hinge (not illustrated) provided at a rear end part of the housing 20 as a fulcrum. The document cover 6 covers an approximate entire area of the upper surface of the housing 20 in a closed state. A rear surface of the document cover 6 is a white color.

The housing 20 is provided with a detection switch 35 for detecting an open and closed state of the document cover 6. The detection switch 35 moves upward by a restoring force of an elastic member (a spring member), protrudes from the upper surface of the housing 20, and enters an off state when the document cover 6 is opened. The detection switch 35 is pressed downward by the document cover 6, retreats to the lower side of the upper surface of the housing 20, and enters an on state when the document cover 6 is closed. The detection switch 35 outputs a signal for transferring an on/off state to a controller 15.

The automatic document feeder 7 is received in the document cover 6. The automatic document feeder 7 conveys a document set in a document feeding tray 7a along a predetermined conveyance path and allows the document to pass through a reading position on the second contact glass 11b. The document having passed through the reading position is discharged to a document discharge tray 7b.

As illustrated in FIG. 2, the reading unit 30 includes a first moving carriage 31, a second moving carriage 32, a condensing lens unit 33, and an imaging element 34. In the first moving carriage 31, an illumination unit 40 and a first reflecting mirror 41 are installed. In the second moving carriage 32, a second reflecting mirror 42 and a third reflecting mirror 43 are installed.

In the reading unit 30, when each of the document reading operation and the document size detection operation is performed, the illumination unit 40 irradiates a document on the contact glass 11 with light. Reflection light reflected from the contact glass 11 after the irradiation from the illumination unit 40 is reflected in sequence of the first reflecting mirror 41, the second reflecting mirror 42, and the third reflecting mirror 43. The second reflecting mirror 42 and the third reflecting mirror 43 invert an optical path. The reflected light of the third reflecting mirror 43 passes through the condensing lens unit 33, so that an image of the reflected light is formed on an imaging surface of the imaging element 34. The imaging element 34 includes a charge coupled device (CCD) and the like and photoelectrically converts the light received in the imaging surface into an analog electric signal. The analog electric signal is converted into a digital electric signal by an A/D conversion circuit (not illustrated) and then is inputted to the controller 15 as image data.

Each of the moving carriages 31 and 32 is driven by a driving mechanism (not illustrated) using a driving motor such as a stepping motor. The first moving carriage 31 reciprocally moves along the lower surfaces of the first contact glass 11a and the second contact glass 11b in the right and left direction. The second moving carriage 32 reciprocally moves in the right and left direction by a half of an amount of movement of the first moving carriage 31 while following the first moving carriage 31. Specifically, in the document reading operation of the manually placing mode, the first moving carriage 31 moves in the right direction from directly under (a home position) the left end of the first contact glass 11a. In this moving operation, light is irradiated toward a document from the illumination unit 40. On the other hand, in the document reading operation of the automatic sheet feeding mode, the first moving carriage 31 moves directly under the second contact glass 11b and enters a stationary state. In this stationary state, light is irradiated toward a document from the illumination unit 40.

—For Illumination Unit—

Figure 4:
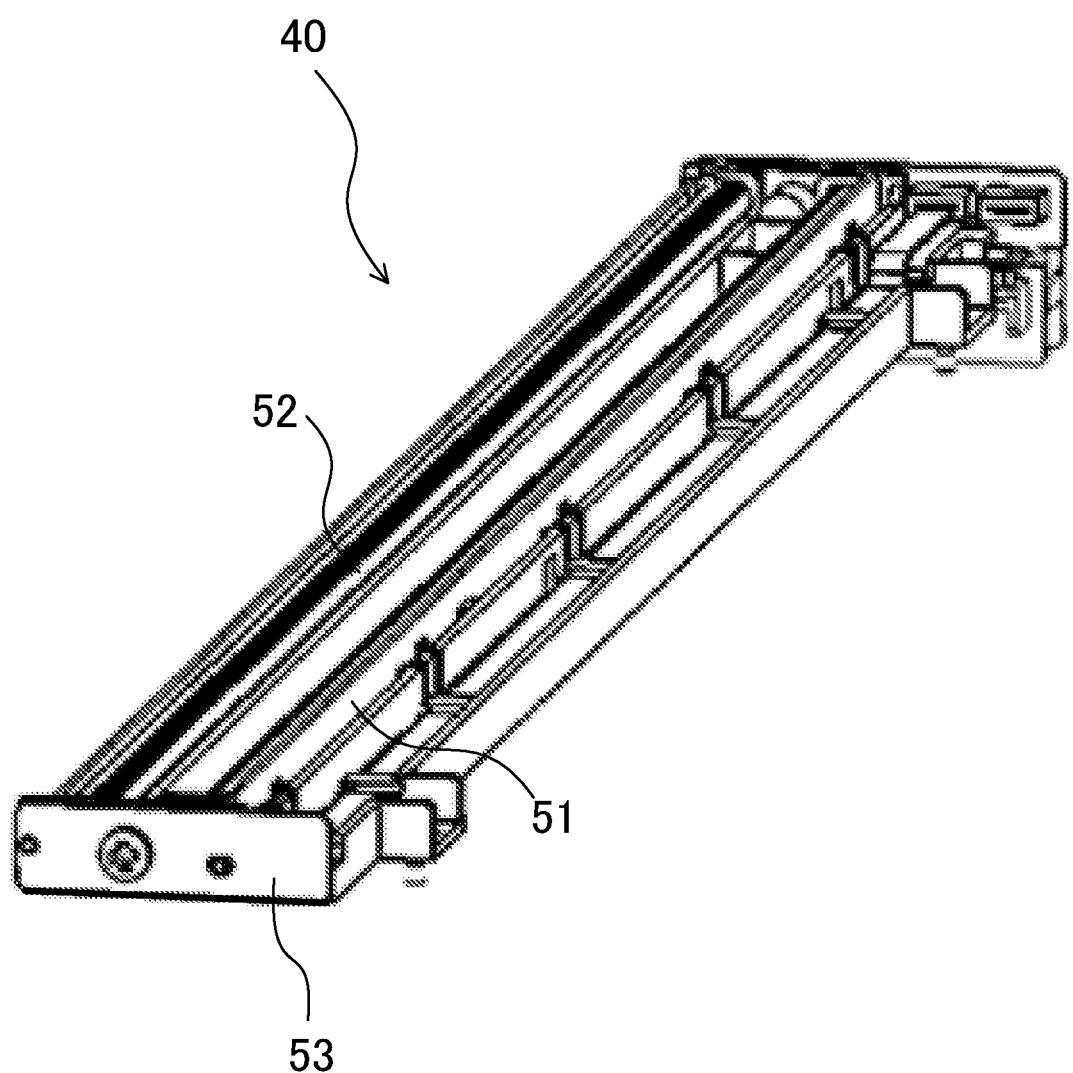
FIG. 4 is a perspective view of an illumination unit of an embodiment.
Figure 5:
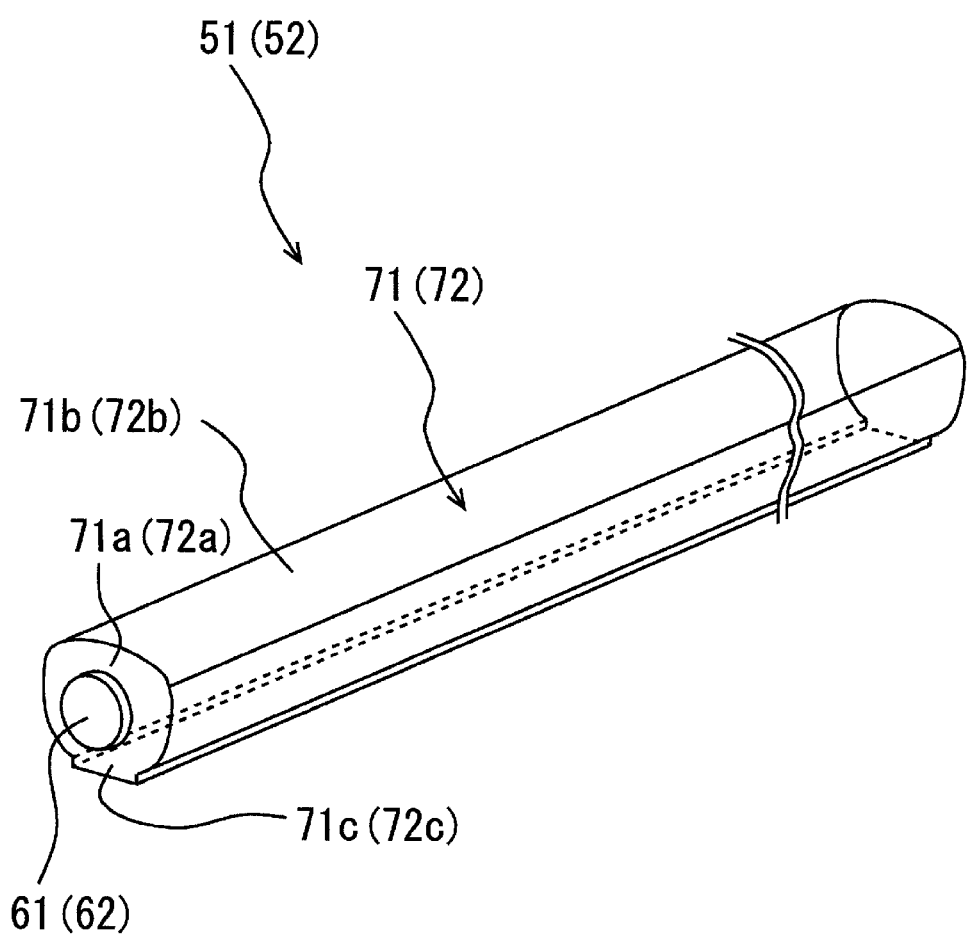
FIG. 5 is a perspective view of an illumination part constituting an illumination unit of an embodiment.

FIG. 4 illustrates a perspective view of the illumination unit 40 in the embodiment. FIG. 5 illustrates a perspective view of illumination parts 51 and 52 constituting the illumination unit 40 in the embodiment. FIG. 6A and FIG. 6B are views for explaining an arrangement of light sources and light guide bodies with respect to the illumination unit 40 in the embodiment. FIG. 6A is a view when the housing 20 is viewed from above and FIG. 6B is a view when an interior of the housing 20 is viewed from the front side.

The illumination unit 40 irradiates illumination light by employing a document on the contact glass 11 as a focal position. As illustrated in FIG. 4, the illumination unit 40 includes a first illumination part 51 and a second illumination part 52 that irradiate linear illumination light long in the front and rear direction, and a support member 53 that support the first illumination part 51 and the second illumination part 52. The support member 53 is mounted in the first moving carriage 31. The illumination unit 40 irradiates light at a position facing the first contact glass 11a or the second contact glass 11b in accordance with the position of the first moving carriage 31. The first illumination part 51 and the second illumination part 52 have the same configuration.

As illustrated in FIG. 5, the first illumination part 51 includes a first light source 61 and a straight rod-like first light guide body 71. The second illumination part 52 includes a second light source 62 and a straight rod-like second light guide body 72. In the illumination parts 51 and 52, the light sources 61 and 62 are provided to the light guide bodies 71 and 72, respectively. In the illumination unit 40, the two light sources 61 and 62 are provided. In FIG. 5, reference numerals without brackets are reference numerals of the first illumination part 51 and reference numerals with brackets are reference numerals of the second illumination part 52.

Each of the light sources 61 and 62 is a white light emitting diode (LED) having a thin disc shape and emitting white light. As the white LED, for example, it is possible to use a high luminance LED package in which a GaN-based or InGaN-based semiconductor light emitting element for emitting blue light or ultraviolet light is sealed with transparent resin containing a fluorescent substance. Each of the light sources 61 and 62 is disposed facing one end surface of each of the light guide bodies 71 and 72.

Each of the light guide bodies 71 and 72 is formed by a translucent resin material such as acrylic resin. In each of the light guide bodies 71 and 72, incident light from end surfaces facing corresponding light sources 61 and 62 propagate, is converted into linear illumination light, and is emitted. Specifically, in each of the light guide bodies 71 and 72, one end surface opposite to the light source 61 or 62 is an incident surface 71a or 72a, an upper surface (a surface facing the contact glass 11) is an emitting surface 71b or 72b, and a bottom surface facing the emitting surface 71b or 72b is a reflecting surface 71c or 72c.

As illustrated in FIG. 6A, the first light guide body 71 and the second light guide body 72 are mounted spaced apart from each other in the support member 53 in parallel to each other. The support member 53 is mounted in the first moving carriage 31 such that the light guide bodies 71 and 72 extend along the front and rear direction. The first light guide body 71 is disposed at a right side of the second light guide body 72 when viewed from the front side of the housing 20. In the sub-scanning direction, when the home position side is defined as an upstream, the first illumination part 51 is disposed at a downstream side of the second illumination part 52.

Furthermore, in the present embodiment, the first light guide body 71 is mounted in the support member 53 such that the first light source 61 is positioned at the front side, and the second light guide body 72 is mounted in the support member 53 such that the second light source 62 is positioned at the rear side. The first light source 61 is positioned in a front side area of the housing 20 and emits incident light to the first light guide body 71 toward the rear side. The second light source 62 is positioned in a rear side area of the housing 20 and emits incident light to the second light guide body 72 toward the front side.

As illustrated in FIG. 6B, the first light guide body 71 and the second light guide body 72 are supported by the support member 53 at the same height. In the support member 53, a path of light toward the first reflecting mirror 41 from the first contact glass 11a is formed inside between the first light guide body 71 and the second light guide body 72. The first light guide body 71 and the second light guide body 72 are inclined by a predetermined angle and are provided with an orientation in which the emitting surfaces 71b and 72b are slightly directed inward. In the first light guide body 71, the emitting surface 71b faces the left obliquely upward when viewed from the front side of the housing 20. In the second light guide body 72, the emitting surface 72b faces the right obliquely upward when viewed from the front side of the housing 20.

The image reading device 3 includes the controller 15 that controls the operation of the image reading device 3. The controller 15 is configured by a microcomputer having a CPU, a ROM, and a RAM. The controller 15 functions as an illumination control unit that controls the illumination unit 40 in each of the document reading operation and the document size detection operation. The controller 15 can individually control the first light source 61 and the second light source 62 in relation to the control of the illumination unit 40. The controller 15 is provided in a control substrate (not illustrate). The control substrate is provided with a first LED driver (not illustrate) in which a switch of the first light source 61 is provided, and a second LED driver (not illustrate) in which a switch of the second light source 62 is provided.

—For Operation of Controller—

Figure 7:
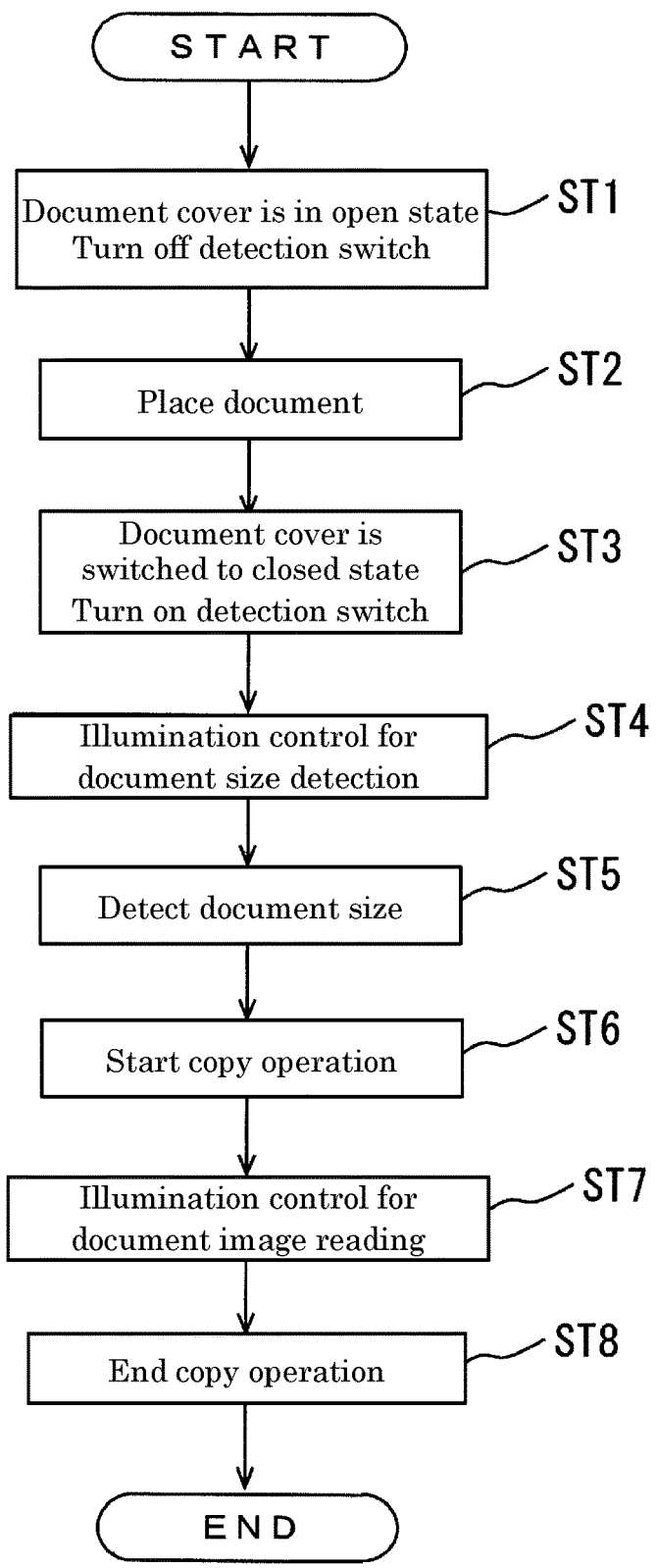
FIG. 7 is a flowchart for explaining a copy operation of a manually placing mode in an image forming apparatus of an embodiment.

The following description will be provided for an operation of the controller 15 when a user places a document on the first contact glass 11a and performs copy. FIG. 7 is a flowchart for explaining a copy operation of the manually placing mode in the image forming apparatus 1. FIG. 8A and FIG. 8B are views for explaining a light illumination state of the illumination unit 40 when the document size detection operation is performed in the image reading device 3. FIG. 9A and FIG. 9B are views for explaining a light illumination state of the illumination unit 40 when the document reading operation of the manually placing mode is performed in the image reading device 3. FIG. 8A and FIG. 9A are views when the housing 20 is viewed from above and FIG. 8B and FIG. 9B are views when the interior of the housing 20 is viewed from the front side.

When the document cover 6 is opened by a user, the detection switch 35 protrudes from the upper surface of the housing 20 and enters an off state (step ST1). When a transfer signal of the off state is received from the detection switch 35, the controller 15 moves the first moving carriage 31 from the home position to a predetermined position (for example, an approximate center position in the right and left direction) in the right direction, and moves the second moving carriage in the right direction according to the movement of the first moving carriage 31.

A document is placed on the first contact glass 11a by the user (step ST2). When the document cover 6 is switched to a closed state from the open state by the user, if the detection switch 35 is pressed by the rear surface of the document cover 6, the detection switch 35 enters an on state (step ST3). When a transfer signal of the on state is received from the detection switch 35, the controller 15 starts the document size detection operation. The document size detection operation is performed before the document cover 6 is closed.

In the document size detection operation, the controller 15 performs illumination control for document size detection with respect to the illumination unit 40 (step ST4). Specifically, the controller 15 turns on only the first light source 61 of the first light source 61 and the second light source 62. As illustrated in FIG. 8A, the first light source 61 emits light toward the rear side from the front side of the first light guide body 71. The light emitted from the first light source 61 is incident on the first light guide body 71 from the incident surface 71a (the front end surface) of the first light guide body 71, propagates through an interior of the first light guide body 71, is reflected by the reflecting surface 71c, and is emitted from the emitting surface 71b. As illustrated in FIG. 8B, the light from the emitting surface 71b is irradiated to the first contact glass 11a while its main emission direction is directed to the left obliquely upward direction when viewed from the front side of the housing 20. In addition, the controller 15 may blink (intermittently lighted) the first light source 61.

Then, the illumination light to the first contact glass 11a is reflected by the lower surface of the first contact glass 11a, is further reflected by the reflecting mirrors 41 to 43, and is led to the imaging element 34. The imaging element 34 generates image data on the basis of the light, of which image has been formed on the imaging surface of the imaging element 34, and outputs the image data to the controller 15. The controller 15 detects a document size on the basis of the image data (step ST5). The reading unit 30 and the controller 15 constitute a document size detection unit that detects the size of the document placed on the first contact glass 11a by using the light irradiated toward the document from the illumination unit 40.

The user presses a copy switch which is in the operation unit 9. When the document cover 6 enters a closed state, the controller 15 starts a copy operation (step ST6). In the copy operation, the controller 15 performs illumination control for document image reading with respect to the illumination unit (step ST7). Specifically, the controller 15 turns on both the first light source 61 and the second light source 62. As illustrated in FIG. 8A, the first light source 61 emits light toward the rear side from the front side of the first light guide body 71 and the second light source 62 emits light toward the front side from the rear side of the second light guide body 72. As illustrated in FIG. 8B, the main emission direction of the light from the emitting surface 71b is directed to the left obliquely upward direction when viewed from the front side of the housing 20, and the main emission direction of the light from the emitting surface 72b is directed to the right obliquely upward direction when viewed from the front side of the housing 20. The illumination light to the first contact glass 11a from the illumination unit 40 is led to the imaging element 34, similarly to the document size detection operation. The imaging element 34 generates image data on the basis of the light, of which image has been formed on the imaging surface of the imaging element 34, and outputs the image data to the controller 15. The controller 15 controls the image forming apparatus body 2 and forms the image of the document on a predetermined sheet on the basis of the image data. In this way, the copy operation is ended (step ST8).

—Effect of Embodiment—

In the present embodiment, in the document size detection operation in which emission light of the illumination unit 40 is leaked from a space between the document cover 6 and the housing 20, light is emitted toward the rear side from the front side of the housing 20 and no light is emitted toward the front side from the rear side of the housing 20 in the illumination unit 40. Therefore, the amount of light recognized by a user located at the front side of the image reading device 3 is small. Accordingly, in the aforementioned related art, when light is emitted toward the front side from the rear side of a housing, since a large amount of light is irradiated to a user, it is probable that the user will feel uncomfortable due to dazzling. However, in the present embodiment, it is possible to suppress the discomfort.

Furthermore, in the present embodiment, in the document size detection operation, the main emission direction of illumination light to the first contact glass 11a is directed to the left obliquely upward when viewed from the front side of the housing 20. Therefore, at the front side of the image reading device 3, the amount of light recognized by a user located near the left side is further reduced when viewed from the front side of the image reading device 3.

Furthermore, in the present embodiment, in the document image reading operation, both the first light source 61 and the second light source 62 are turned on. Therefore, it is possible to ensure an amount of light sufficient for reading a document image.

<<Other Embodiments>>

In the aforementioned present embodiment, one light source 61 and one light source 62 are provided to the light guide bodies 71 and 72, respectively; however, two light sources 61 and two light sources 62 may be provided to the light guide bodies 71 and 72, respectively. In this case, for example, a light source opposite to an end surface is provided to the front side and the rear side of each of the light guide bodies 71 and 72. In the document size detection operation, the front two light sources may be turned on or only one of the front two light sources may be turned on.

In the aforementioned present embodiment, two light guide bodies 71 and 72 are provided in the illumination unit 40; however, only one light guide body may be provided and a light source facing an end surface may be provided to the front side and the rear side of the light guide body.

In the aforementioned present embodiment, a multifunctional peripheral has been described as an example of the image forming apparatus 1; however, the technology of the present disclosure is not limited thereto and for example, the image forming apparatus 1 may be a copy machine, a facsimile and the like.

In the aforementioned present embodiment, an example, in which the image reading device 3 is applied to the electrophotographic image forming apparatus 1 has been described; however, the technology of the present disclosure is not limited thereto and for example, the image reading device 3 may be applied to an inkjet type image forming apparatus 1.

What is claimed is:

1. An image reading device comprising:
   a housing that is provided on an upper surface thereof with a contact glass;
   a document cover that is mounted at the housing so as to be openable and closable and covers the contact glass in a closed state;
   an illumination unit that is located in the housing and irradiates a document on the contact glass from a rear surface of the contact glass; and a document size detection unit that performs a document size detection operation for detecting a size of the document by using light irradiated toward the document on the contact glass from the illumination unit when the document cover is switched to the closed state from an open state, wherein the illumination unit includes a first light guide body and a second light guide body extending in a front and rear direction of the housing, a first light source that is disposed at a front side of the first light guide body and emits incident light to the first light guide body toward a rear side, and a second light source that is disposed at a rear side of the second light guide body and emits incident light to the second light guide body toward a front side, and in the first and second light guides bodies, an emitting surface of the light incident to the first light guide body from the front side and incident to the second light guide body from the rear side is opposite to the contact glass, and in the document size detection operation, only the first light source of the first light source and the second light source is turned on.

2. The image reading device of claim 1, wherein when an image of the document is read after the document size detection operation, both the first light source and the second light source are turned on.

3. The image reading device of claim 1, wherein the first light guide body corresponding to the first light source is provided such that a main emission direction of illumination light toward the contact glass is directed in a left obliquely upward direction when viewed from a front side of the housing.

4. An image forming apparatus comprising:

the image reading device of claim 1; and an image forming apparatus body that forms an image of the document read by the image reading device on a sheet.

5. The image forming apparatus of claim 4, further comprising:

an operation panel provided on a front side of the image forming apparatus body, wherein the housing of the image reading device is disposed on an upper side of the image forming apparatus body, and a front side of the housing of the image reading device coincides with the front side of the image forming apparatus body.

* * * * *